United States Patent
Abbot et al.

(10) Patent No.: US 9,229,843 B2
(45) Date of Patent: Jan. 5, 2016

(54) PREDICTIVELY MANAGING FAILOVER IN HIGH AVAILABILITY SYSTEMS

(75) Inventors: Stephen N. Abbot, Austin, TX (US); James Allen Goodwin, Austin, TX (US); Manjunath Basappa Muttur, Karnataka (IN); Thomas Howard Smith, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1003 days.

(21) Appl. No.: 12/768,992

(22) Filed: Apr. 28, 2010

(65) Prior Publication Data
US 2011/0271136 A1 Nov. 3, 2011

(51) Int. Cl.
*G06F 11/36* (2006.01)
*G06F 11/20* (2006.01)

(52) U.S. Cl.
CPC ........ *G06F 11/3608* (2013.01); *G06F 11/2023* (2013.01); *G06F 11/2043* (2013.01)

(58) Field of Classification Search
CPC G06F 11/2023; G06F 11/2035; G06F 11/203
USPC .............................................................. 714/3
See application file for complete search history.

(56) References Cited

U.S. PATENT DOCUMENTS

| | | | |
|---|---|---|---|
| 2003/0126312 A1* | 7/2003 | Frolund et al. ................. | 709/328 |
| 2003/0140285 A1* | 7/2003 | Wilkie ............................ | 714/48 |
| 2006/0212778 A1* | 9/2006 | Wheeler et al. ................ | 714/764 |
| 2007/0226333 A1* | 9/2007 | Morich et al. ................. | 709/224 |
| 2008/0072105 A1* | 3/2008 | Fujibayashi ..................... | 714/47 |
| 2008/0189700 A1* | 8/2008 | Schmidt et al. .................. | 718/1 |
| 2008/0263390 A1 | 10/2008 | Baba et al. | |
| 2009/0171730 A1 | 7/2009 | Bobak et al. | |

* cited by examiner

*Primary Examiner* — Jigar Patel
(74) *Attorney, Agent, or Firm* — Garg Law Firm, PLLC; Rakesh Garg; Damion Josephs

(57) ABSTRACT

A method, system, and computer usable program product for predictively managing failover in a high availability system are provided in the illustrative embodiments. A disruptive activity occurring on the HA data processing system is detected. The disruptive activity has a potential to cause an operation of the HA data processing system to perform outside a specified parameter. A determination is made of a desired response in the HA data processing system should the disruptive activity disrupting the operation. A precautionary action is initiated with respect to the HA data processing system.

20 Claims, 5 Drawing Sheets

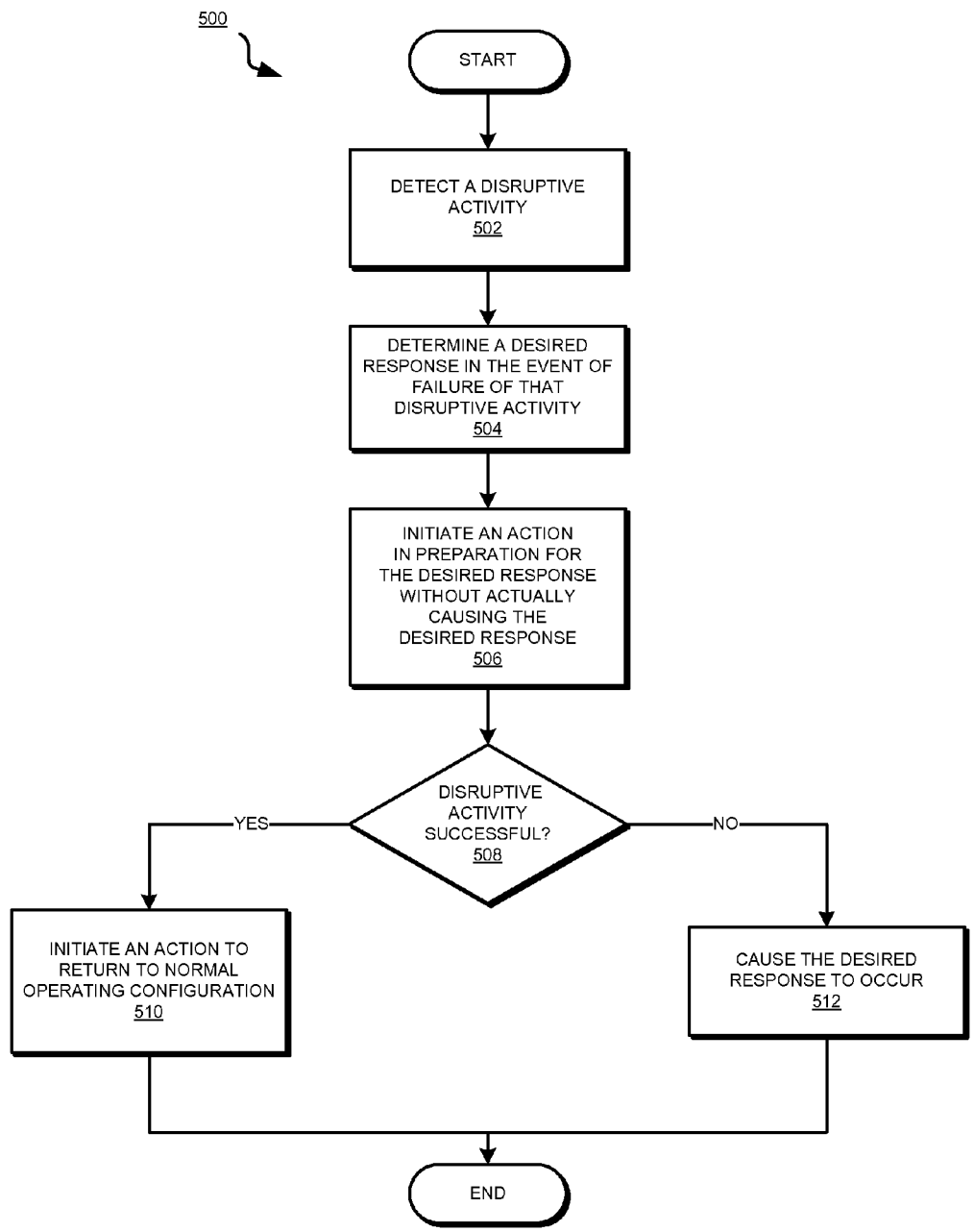

US 9,229,843 B2

PREDICTIVELY MANAGING FAILOVER IN HIGH AVAILABILITY SYSTEMS

BACKGROUND OF THE INVENTION

1. Field of the Invention

The present invention relates generally to an improved data processing system, and in particular, to a computer implemented method for managing system disruption in data processing systems. Still more particularly, the present invention relates to a computer implemented method, system, and computer usable program code for predictively managing failover in high availability data processing systems.

2. Description of the Related Art

Data processing systems can be configured in a variety of ways. For example, the components in a data processing system may be configured to operate in a manner such that the data processing system behaves as a single data processing unit. The memory in such a configuration operates to support data manipulation for the single data processing unit.

As another example, data processing systems can be divided into logical partitions (LPARs). Such data processing systems are also known as logical partitioned data processing systems. A logical partition is also known simply as a "partition." Each partition operates as a separate data processing system independent of the other partitions. Generally, a partition management firmware component connects the various partitions and provides the network connectivity among them. A Hypervisor is an example of such partition management firmware.

Workload partition is a technology that allows separating users and applications by employing software techniques instead of forming separate hardware partitions. In other words, a data processing system can be so configured as to allow one or more virtual partitions to operate within the data processing system's operating system. Such a virtual partition is called a workload partition, or WPAR.

A WPAR shares the operating system and resources of the host data processing system. Resources accessible to the operating system of the host data processing system are said to belong to a "global space". Conversely, a resource in the global space can be accessed by the operating system of the host data processing system. One or more WPARs can be configured in a data processing system, such as a LPAR.

A high availability (HA) system is a data processing system configured to ensure a threshold level of operational continuity during a given period. Availability refers to the ability of the users and applications to access the data processing system, whether to submit new work, update or alter existing work, or collect the results of previous work. If a user or application cannot access the system, the system is said to be unavailable. Generally, the term downtime is used to refer to periods when a system is unavailable. HA systems are often employed in business organizations to deliver business critical applications and services.

An HA system can be configured using a one or more physical or logical data processing systems. For example, one HA system may include several standalone physical data processing systems configured to operate in unison. As another example, several logical data processing systems, such as LPARs, may be configured to operate together to form a HA system.

As another example, a combination of one or more WPARs, LPARs, and physical data processing systems may also form a part of a HA system. Such a combination is called a cluster. HA systems or clusters therein may further include other components, systems, or devices. For example, a cluster may include an array of data storage devices, such as a storage area network (SAN). As another example, a HA system or a cluster therein may also include a networking device, such as a switch.

SUMMARY OF THE INVENTION

The illustrative embodiments provide a method, system, and computer usable program product for predictively managing failover in a high availability system. An embodiment detects a disruptive activity occurring on the HA data processing system. The disruptive activity has a potential to cause an operation of the HA data processing system to perform outside a specified parameter. The embodiment determines a desired response in the HA data processing system should the disruptive activity disrupting the operation. The embodiment initiates a precautionary action with respect to the HA data processing system.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 5 depicts a flowchart of a process of predictively managing failover in a high availability data processing system in accordance with an illustrative embodiment.

DETAILED DESCRIPTION OF THE PREFERRED EMBODIMENT

Figure 1:
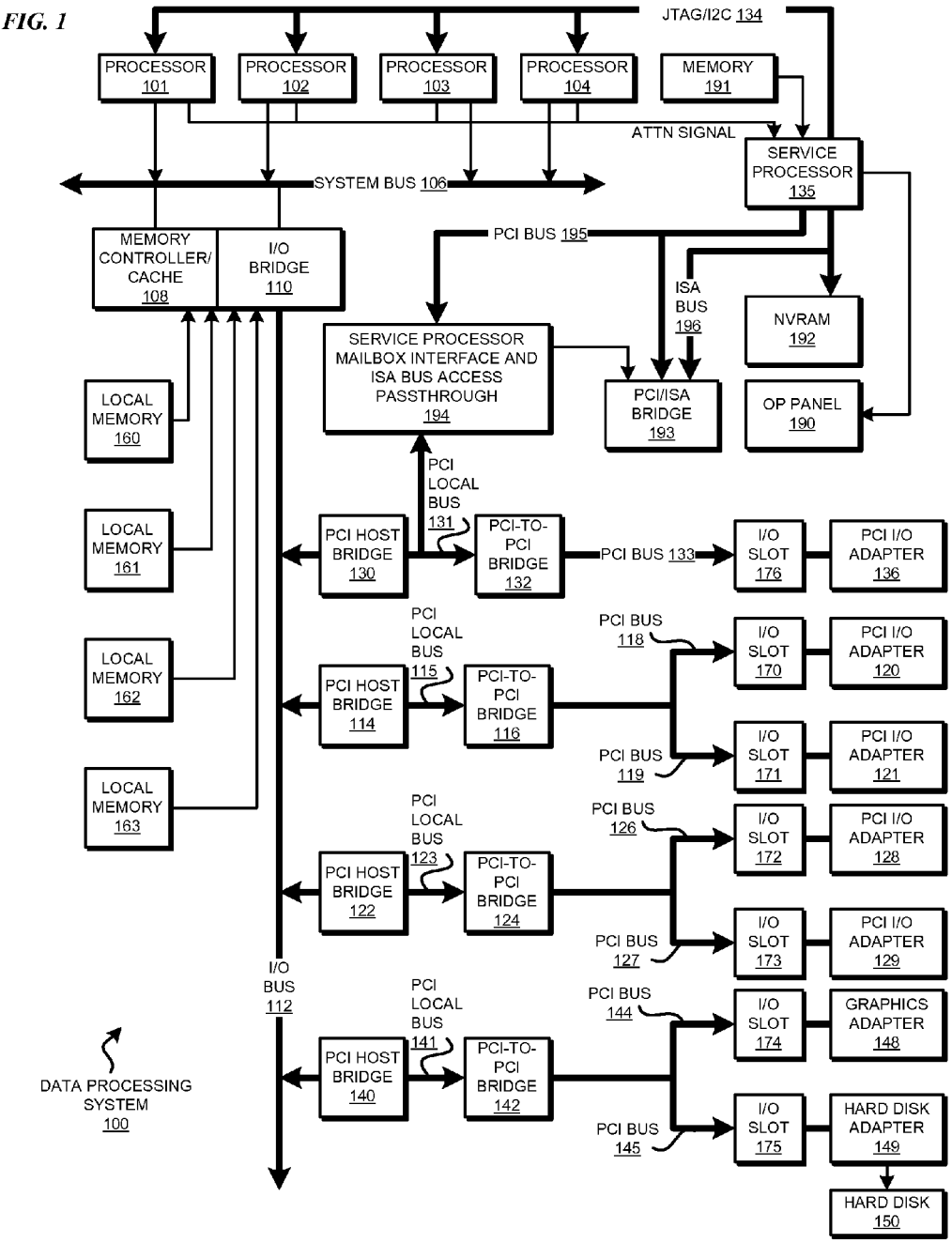
FIG. 1 depicts a block diagram of a data processing system in which the illustrative embodiments may be implemented is depicted.

Often, HA systems include redundant systems for failover. Failover is a process of substituting one instance of a system, subsystem, device, application, or a component thereof with another similar instance. Furthermore, the substitution in a failover is performed in such a manner that continuity of operations being performed on the instance being replaced is maintained on the replacement instance.

Failover may occur in a HA data processing environment for a variety of reasons. For example, one system may have to be failed over to another system to perform maintenance on the first system. As another example, an operator error in one system may cause a failover. Hardware failure in a system or component may also cause a failover. Bugs or erroneous operations in an application may cause the application to failover to another instance of the application. System software bugs, such as an error in an operating system, may cause a failover of an entire system, a component, an application, or a combination thereof. Conditions existing in the data processing environment at a given time may trigger failover logic that may failover a combination of systems and applications.

Failovers can occur in a HA data processing environment for many other reasons. Any activity, operation, condition, or a combination thereof, that has the potential to cause a failover is collectively referred to a disruptive activity in this disclosure. Note that a disruptive activity according to the invention may or may not actually be disruptive. Disruptive activities according to the invention include those activities that only have a potential to cause a disruption in the HA environment. A disruption in the HA environment according to the invention may not stop or interrupt an operation but may cause the operation to perform outside of acceptable performance parameters for that operation.

The invention recognizes that a failover process is computationally expensive. For example, substantial processor time, memory, network bandwidth, and other computing resources are consumed in failing over a system such that operational continuity is maintained in the HA data processing environment.

The invention further recognizes that certain disruptive activities are more likely than others to cause a failover. The invention also recognizes that in some present HA configurations, a failover may occur when failover was not actually needed. Such failovers are called false failover.

For example, in some HA configurations, mere performance of a disruptive activity may cause a delayed response from an application leading the HA configuration to respond by failing over the application or system. A failover caused by a maintenance operation on a system is a particularly good example of false failover. For example, a maintenance operation can cause additional load on a system or cause a component to become temporarily unavailable. An HA configuration may detect the reduced response rate due to the additional load, or the temporary unavailability, as an indication of a disruption in the operation of the HA system. The HA system may execute a failover in response.

The invention recognizes that false failovers can have substantial effect on resource consumption, performance degradation and other characteristics of a HA environment. To give an example, a popular data processing system used in HA environments can include up to eighty LPARs. Each LPAR in turn can execute as many as eight thousand WPARs. Thus, the data processing system can include up to six hundred and forty thousand high availability clustered multiprocessing nodes (HACMP). A false failover due to a disruptive activity can affect the operations of a significant number of clusters.

The illustrative embodiments used to describe the invention address and solve these and other problems related to failovers in HA systems. The illustrative embodiments provide a method, computer usable program product, and data processing system for predictively managing failover in a high availability system. Using the illustrative embodiments, a HA data processing system can determine a nature of the disruptive activity, prepare for an efficient failover, should one be needed, and avoid a false failover when a disruptive activity is not sufficient to warrant a failover.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to any type of HA system, including standalone physical HA data processing system, logically partitioned data processing environments, or a combination thereof.

Furthermore, the illustrative embodiments are described in some instances using particular software tools and data processing environments only as an example for the clarity of the description. The illustrative embodiments may be used in conjunction with other comparable or similarly purposed systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
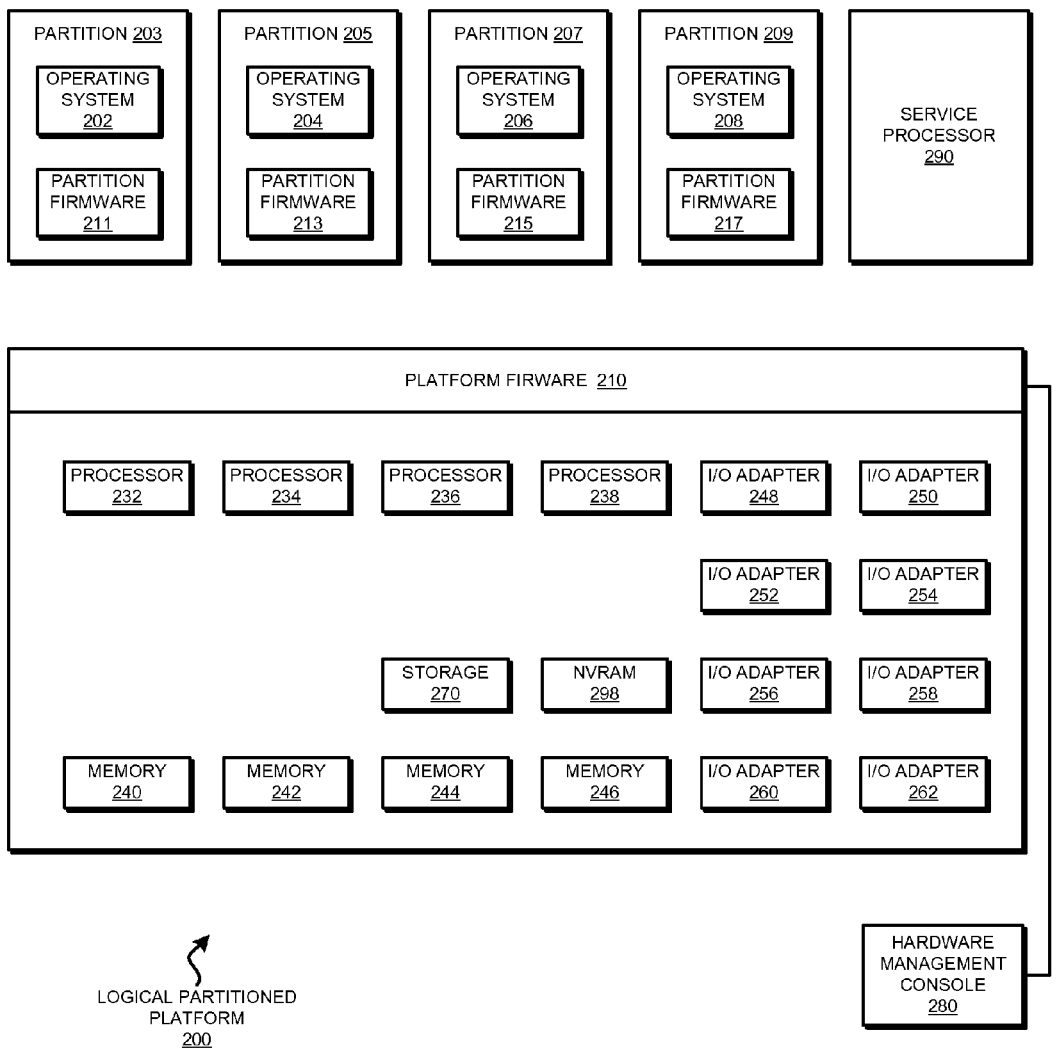
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM or NVRAM).

Additionally, these partitions also include partition firmware 211, 213, 215, and 217. Partition firmware 211, 213, 215, and 217 may be implemented using initial bootstrap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by platform firmware 210. Thereafter, control is transferred to the bootstrap code with the bootstrap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

A data processing environment, such as logical partition platform 200 in FIG. 2, may form a HA environment. An administration application may execute in a data processing system, such as in partition 203 in FIG. 2. The administration application may include functions for coordinating maintenance, modification, manipulations, and generally any disruptive activity pertaining to the HA environment. As an example, a hardware management console (HMC) or an equivalent thereof, may act as or include such an administration application.

The HA environment may further include a log. The log may include data entries corresponding to planning, coordinating, starting, progressing, and concluding a disruptive activity in the HA environment. For example, HMC log may be, include, or be usable as such a log.

Typically, a user, an application, or a process that initiates or coordinates a disruptive activity adds or manipulates one or more entries in such a log. The log may be implemented as a file, a database, a data structure, or as any other structure suitable for such a purpose.

Other applications may execute within or in conjunction with the HA environment. For example, a monitoring application in accordance with an illustrative embodiment may be an application that may execute anywhere such that the log is accessible to the monitoring application over some type of data network.

Figure 3:
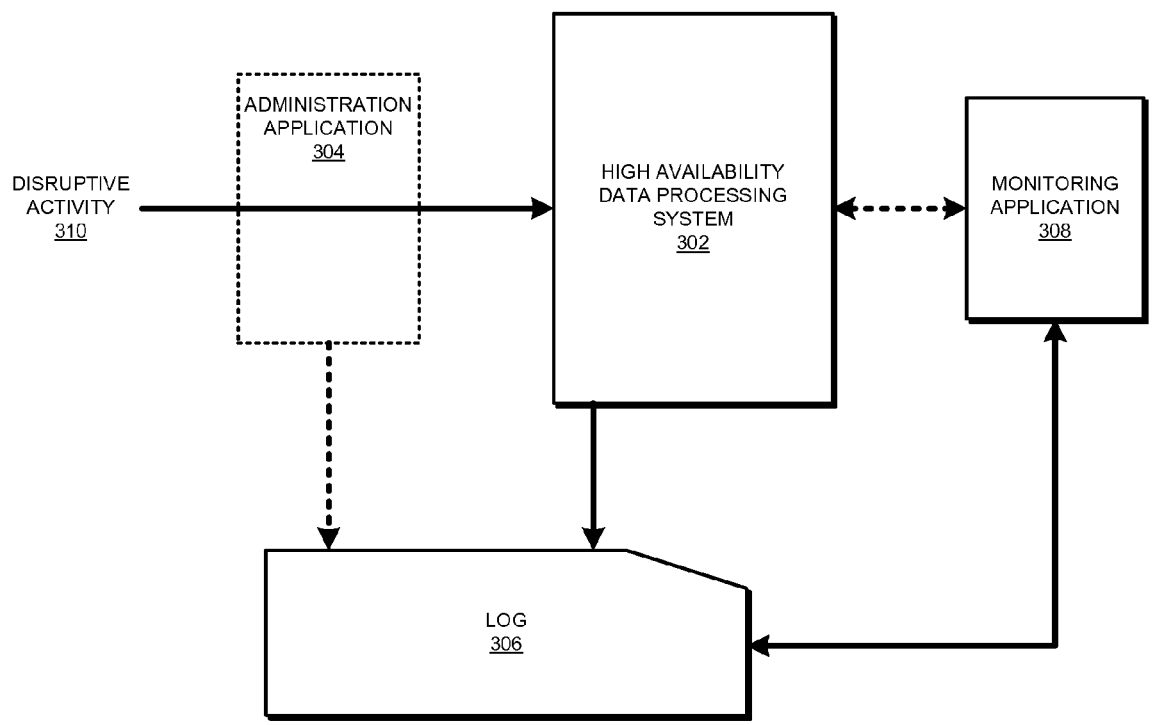
FIG. 3 depicts a block diagram of a configuration for predictively managing failover in a HA system in accordance with an illustrative embodiment.

With reference to FIG. 3, this figure depicts a block diagram of a configuration for predictively managing failover in a HA system in accordance with an illustrative embodiment. HA data processing system 302 may be any HA system, such as a HA system implemented using logical partition platform 200 in FIG. 2.

Administration application 304 may be an administration application as described above. Log 306 may be a log as described above. Monitoring application 308 may be a monitoring application in accordance with an illustrative embodiment. Disruptive activity 310 may be any disruptive activity within the scope of the invention.

In operation, at a given time, disruptive activity 310 may be performed by planning, scheduling, configuring, initiating, or executing with respect to HA data processing system 302 or an associated component. For example, disruptive activity 310 may be performed with respect to a power supply unit distinct from but configured for use by HA data processing system 302.

Disruptive activity 310 is so performed using administration application 304. At such time, administration application 304 makes, modifies, or otherwise manipulates a data entry in log 306. The data entry in log 306 includes information sufficient to identify and understand the nature of disruptive activity 310. For example, an entry in log 306 may include a name, class, category, executable file, and time of execution of disruptive activity 310. The entry may further include, systems affected, applications affected, data used, limitations imposed, and other consequences of disruptive activity 310.

Monitoring application 308 detects the addition or modification of such an entry in log 306. In one embodiment, monitoring application 308 makes this detection synchronously or near-simultaneously with the addition or modification of the entry. In another embodiment, monitoring application 308 is configured to receive notification of addition or modification of entries. In another embodiment, monitoring application 308 may periodically access log 306 and retrieve data of the entries therein.

Figure 4:
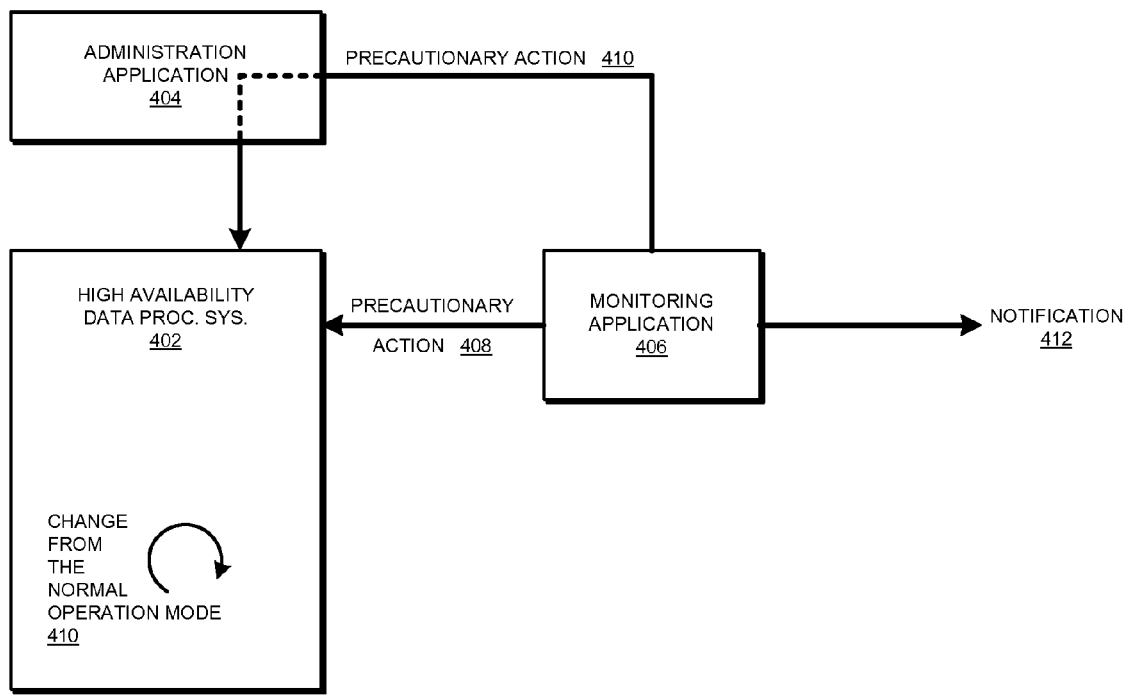
FIG. 4 depicts a block diagram of a second configuration for predictively managing failover in a HA system in accordance with an illustrative embodiment.

With reference to FIG. 4, this figure depicts a block diagram of a second configuration for predictively managing failover in a HA system in accordance with an illustrative embodiment. HA data processing system 402, administration application 404, and monitoring application 406 may be similar to the corresponding depictions in FIG. 3.

In operation, upon detecting an addition or modification of a data entry in a log, such as log 306 in FIG. 3, monitoring application 406 may perform a set of actions. For example, monitoring application 404 may take precautionary action 408 directly on HA data processing system 402. Precautionary action 408 may perform a configuration of HA data processing system 402 such that HA data processing system 402 changes state 410. For example, HA data processing system 402 may transition from a normal operation mode to a fast failover detection mode.

In a fast failover detection mode, HA data processing system 402 may configure certain components, systems, or applications to be ready for failover while not actually executing the failover. For example, fast failover detection mode may cause a certain application to enable application checkpointing. As another example, fast failover detection mode may cause an application to begin file-system synchronization or backup. As another example, fast failover detection mode may cause an application to save a snapshot of various memories, processes, and configurations in a cluster.

These fast failover detection mode operations are only examples of the possibilities. They are not intended to be limiting on the invention. Those of ordinary skill in the art may be able to perform these and many other operations using an embodiment and the same are contemplated within the scope of the invention.

Furthermore, precautionary action 408 may cause additional or different activities to occur in HA data processing system 402. For example, in certain circumstances, making HA data processing system 402 less sensitive to a disruptive activity may be desirable.

For example, presently, HA data processing system 402 may detect a delay in a response from a component as an indication of a disruption and perform a failover. In using an embodiment, precautionary action 408 may configure HA data processing system 402 such that HA data processing system 402 allows the component additional time to respond during a defined period of the disruptive activity.

As another example, presently, a cluster in HA data processing system 402 may be configured to send a heartbeat at a predetermined rate. Missing a predetermined number of heartbeats from a component may cause the cluster to detect a failover condition and perform a failover of the component. In using an embodiment, precautionary action 408 may configure the cluster in HA data processing system 402 such that the predetermined number of missed heartbeats can be increased to reduce the sensitivity or decreased to increase the sensitivity in detecting a failover condition. Thus configured, the cluster may allow the component additional time to transmit heartbeats during a defined period of the disruptive activity.

The fast failover detection mode, the delay in response, and the change in heartbeat configuration are only examples of precautionary action 408 and are not limiting on the invention. Many other similar or different precautionary actions will be conceivable from this disclosure and the same are contemplated within the scope of the invention.

In another embodiment, monitoring application 406 may perform precautionary action 410 through administration application 404. Precautionary action 410 may be similar to precautionary action 408. In one embodiment, some precautionary actions may be performable as precautionary action 408 and others as precautionary action 410.

Additionally, monitoring application 406 may also transmit notification 412. For example, a client data processing system may be notified of a disruptive activity using notification 412 so that the client data processing system can take certain precautionary measures. Similarly, an administrator, such as a cluster administrator may be notified of the disruptive activity.

Furthermore, of all the activities possible with respect to HA data processing system 402, a set of activities may be regarded as disruptive activities. A set of activities is one or more activities. Such a set of activities may be pre-selected in an HA environment, and may be changed dynamically as needed. In one embodiment, monitoring application 406 may query the log looking for only those activities that belong to that set thereby minimizing the monitoring overhead.

When a disruptive activity completes, the log may include another entry that indicates the completion. Monitoring application 406 may detect the completion from such an entry and perform a restorative action in the manner of precautionary action 408 or 410 (not shown). The restorative action may cause HS data processing system 402 to return to normal operating mode.

Some disruptive activities may not make a completion entry in the log. An embodiment may cause monitoring application 406 to perform the restorative action after a pre-determined time if a disruption has not actually occurred to cause a failover during that pre-determined time.

With reference to FIG. 5, this figure depicts a flowchart of a process of predictively managing failover in a high availability data processing system in accordance with an illustrative embodiment. Process 500 may be implemented in a monitoring application, such as monitoring application 406 in FIG. 4.

Process 500 begins by detecting a disruptive activity (step 502). Process 500 determines a desired response in the event of a failure of that disruptive activity (step 504).

Process 500 initiates an action in preparation for the desired response without actually causing the desired response (step 506). For example, process 500 may cause the HA system to enter a fast failover detection mode to enable expedient failover if needed, without actually failing over.

Process 500 detects whether the disruptive activity has completed successfully (step 508). If the disruptive activity has completed successfully ("Yes" path of step 508), process 500 initiates an action, such as a restorative action, to return the HA system to normal operation configuration (step 510).

If the disruptive activity has not completed successfully ("No" path of step 508), process 500 may cause the desired response to occur (step 512). For example, a failover may actually occur as result of step 512. Process 500 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for predictively managing failover in a high availability system. An embodiment may allow a HA configuration to avoid false failover and expedite a failover when one is actually needed.

The invention can take the form of an entirely hardware embodiment, entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for predictively managing a failover in a high availability (HA) data processing system, comprising:
   detecting a disruptive activity occurring on the HA data processing system, wherein the disruptive activity is planned to be performed with respect to the HA data processing system and has a potential to cause an operation of the HA data processing system to perform outside a specified parameter;
   determining a desired response in the HA data processing system, should the disruptive activity actually disrupt the operation; and
   initiating a precautionary action with respect to the HA data processing system, the precautionary action expediting the desired response.

2. The computer implemented method of claim 1, further comprising:
   determining whether the disruptive activity has completed; and
   returning, responsive to determining that the disruptive activity has completed, the HA data processing system to a normal operating mode.

3. The computer implemented method of claim 2, further comprising:
   causing, responsive to determining that the disruptive activity has failed, the desired response to occur in the HA data processing system.

4. The computer implemented method of claim 2, wherein determining whether the disruptive activity has completed is accomplished by querying a log, the log including an entry indicating completion of the disruptive activity.

5. The computer implemented method of claim 2, wherein determining whether the disruptive activity has completed further comprises:
   allowing a predetermined period to elapse from a time of starting of the disruptive activity;
   determining that the disruptive activity has not actually caused the operation of the HA data processing system to be disrupted;
   concluding, responsive to the operation not having been disrupted, that the disruptive activity has completed; and
   performing a restorative action on the HA data processing system.

6. The computer implemented method of claim 1, wherein detecting the disruptive activity further comprises:
  querying a log, the log including an entry indicating an initiation of the disruptive activity.

7. The computer implemented method of claim 1, wherein the desired response is a failover in the HA data processing system, wherein the precautionary action changes a sensitivity of the HA data processing system to the disruptive activity, and wherein changing the sensitivity of the HA data processing system to the disruptive activity allows the disruptive activity to complete without actually disrupting the operation thereby avoiding the failover.

8. The computer implemented method of claim 1, wherein the precautionary action is configured to cause the desired response at a rate faster than a second rate at which the desired response would occur in the HA data processing system without the precautionary action.

9. The computer implemented method of claim 1, wherein the precautionary action causes the HA data processing system to change from a normal operation mode to a fast failover detection mode.

10. The computer implemented method of claim 1, wherein the precautionary action causes the HA data processing system to activate checkpointing in an application executing in the HA data processing system.

11. The computer implemented method of claim 1, wherein the precautionary action causes the HA data processing system to save a snapshot of a cluster configuration.

12. The computer implemented method of claim 1, wherein the precautionary action causes a client data processing system to be notified of the disruptive activity, the client using the notification to modify an operation of the client data processing system.

13. A computer usable program product comprising a computer usable storage medium including computer usable code for predictively managing a failover in a high availability (HA) data processing system, the computer usable code comprising:
  computer usable code for detecting a disruptive activity occurring on the HA data processing system, wherein the disruptive activity is planned to be performed with respect to the HA data processing system and has a potential to cause an operation of the HA data processing system to perform outside a specified parameter;
  computer usable code for determining a desired response in the HA data processing system, should the disruptive activity actually disrupt the operation; and
  computer usable code for initiating a precautionary action with respect to the HA data processing system, the precautionary action expediting the desired response.

14. The computer usable program product of claim 13, further comprising:
  computer usable code for determining whether the disruptive activity has completed; and
  computer usable code for returning, responsive to determining that the disruptive activity has completed, the HA data processing system to a normal operating mode.

15. The computer usable program product of claim 14, further comprising:
  computer usable code for causing, responsive to determining that the disruptive activity has failed, the desired response to occur in the HA data processing system.

16. The computer usable program product of claim 14, wherein determining whether the disruptive activity has completed is accomplished by querying a log, the log including an entry indicating completion of the disruptive activity.

17. The computer usable program product of claim 14, wherein determining whether the disruptive activity has completed further comprises:
  computer usable code for allowing a predetermined period to elapse from a time of starting of the disruptive activity;
  computer usable code for determining that the disruptive activity has not actually caused the operation of the HA data processing system to be disrupted;
  computer usable code for concluding, responsive to the operation not having been disrupted, that the disruptive activity has completed; and
  computer usable code for performing a restorative action on the HA data processing system.

18. The computer usable program product of claim 13, wherein the computer usable code is stored in a computer readable storage medium in a data processing system, and wherein the computer usable code is transferred over a network from a remote data processing system.

19. The computer usable program product of claim 13, wherein the computer usable code is stored in a computer readable storage medium in a server data processing system, and wherein the computer usable code is downloaded over a network to a remote data processing system for use in a computer readable storage medium associated with the remote data processing system.

20. A data processing system for predictively managing a failover in a high availability (HA) data processing system, the data processing system comprising:
  a storage device including a storage medium, wherein the storage device stores computer usable program code; and
  a processor, wherein the processor executes the computer usable program code, and wherein the computer usable program code comprises:
    computer usable code for detecting a disruptive activity occurring on the HA data processing system, wherein the disruptive activity is planned to be performed with respect to the HA data processing system and has a potential to cause an operation of the HA data processing system to perform outside a specified parameter;
    computer usable code for determining a desired response in the HA data processing system, should the disruptive activity actually disrupt the operation; and
    computer usable code for initiating a precautionary action with respect to the HA data processing system, the precautionary action expediting the desired response.

* * * * *